US012126617B2

(12) United States Patent
Ouellet

(10) Patent No.: US 12,126,617 B2
(45) Date of Patent: Oct. 22, 2024

(54) METHOD AND SYSTEM FOR GRANTING REMOTE ACCESS TO AN ELECTRONIC DEVICE

(71) Applicant: GENETEC INC., St-Laurent (CA)

(72) Inventor: Sylvain Ouellet, Laval (CA)

(*) Notice: Subject to any disclaimer, the term of this patent is extended or adjusted under 35 U.S.C. 154(b) by 434 days.

(21) Appl. No.: 17/695,023

(22) Filed: Mar. 15, 2022

(65) Prior Publication Data

US 2022/0311767 A1    Sep. 29, 2022

Related U.S. Application Data

(60) Provisional application No. 63/166,628, filed on Mar. 26, 2021.

(51) Int. Cl.
*G06F 7/04* (2006.01)
*H04L 9/08* (2006.01)
(Continued)

(52) U.S. Cl.
CPC ........ *H04L 63/0869* (2013.01); *H04L 9/0822* (2013.01); *H04L 9/3226* (2013.01); *H04L 12/12* (2013.01)

(58) Field of Classification Search
CPC . H04L 63/0869; H04L 9/0822; H04L 9/3226; H04L 12/12; H04L 63/083;
(Continued)

(56) References Cited

U.S. PATENT DOCUMENTS 8,707,399 B2 * 4/2014 McIntyre .............. H04L 63/104
726/4
8,850,525 B1 * 9/2014 Wilkinson ............ G06F 21/445
718/1
(Continued)

FOREIGN PATENT DOCUMENTS

CN    110992532 A    4/2020
CN    111935191 A    11/2020
(Continued)

OTHER PUBLICATIONS

Islam et al, Improved Remote Login Scheme Based on ECC, IEEE, Jun. 5, 2011, pp. 1221-1226. (Year: 2011).*
(Continued)

*Primary Examiner* — Philip J Chea
*Assistant Examiner* — Jenise E Jackson
(74) *Attorney, Agent, or Firm* — Anglehart et al.

(57) ABSTRACT

Methods, systems, devices and computer-readable media for granting remote access to an electronic device are described herein. An electronic device obtains an encrypted password comprising a password encrypted with a public encryption key. The electronic device outputs the encrypted password for a device user computer to transmit the encrypted password to a support computer to have the encrypted password decrypted with a private encryption key corresponding to the public encryption key. The electronic device receiving an access request comprising the password from the support computer. The electronic device grants the support computer access thereto when the password of the access request from the support computer corresponds to the password at the electronic device.

30 Claims, 9 Drawing Sheets

(51) Int. Cl.
    *H04L 9/32*     (2006.01)
    *H04L 9/40*     (2022.01)
    *H04L 12/12*     (2006.01)

(58) Field of Classification Search
    CPC . H04L 63/0838; H04L 63/0846; H04L 63/10; H04L 9/08; H04L 9/0816; H04L 9/0819; H04L 9/0825; G06F 21/305; G06F 21/31; G06F 21/335; G06F 21/35; G06F 21/44
    See application file for complete search history.

(56) References Cited

U.S. PATENT DOCUMENTS

| | | | |
|---|---|---|---|
| 9,166,973 | B2 | 10/2015 | Kanungo et al. |
| 9,473,492 | B2 | 10/2016 | Negahdar |
| 10,826,875 | B1* | 11/2020 | Kim .................. H04L 63/0428 |
| 2003/0065731 | A1* | 4/2003 | Mohammed ............ G06F 21/33 |
| | | | 709/225 |
| 2005/0044379 | A1 | 2/2005 | Beard et al. |
| 2010/0082734 | A1* | 4/2010 | Elcock .................... H04L 63/08 |
| | | | 713/168 |
| 2012/0066504 | A1 | 3/2012 | Hird et al. |
| 2012/0254622 | A1* | 10/2012 | Kanungo ................ G06F 21/34 |
| | | | 713/183 |
| 2013/0067229 | A1* | 3/2013 | German .............. H04L 63/0846 |
| | | | 713/171 |
| 2013/0159195 | A1 | 6/2013 | Kirillin et al. |
| 2015/0312041 | A1 | 10/2015 | Choi |
| 2018/0351797 | A1 | 12/2018 | Negahdar |
| 2019/0268149 | A1 | 8/2019 | Kariv et al. |
| 2020/0186358 | A1 | 6/2020 | Capola et al. |

FOREIGN PATENT DOCUMENTS

| | | |
|---|---|---|
| CN | 111404680 B | 1/2021 |
| CN | 112184967 A | 1/2021 |

OTHER PUBLICATIONS

Rahman et al., Remote Access and Networked Appliance Control Using Biometrics Feature, IEEEE, May 2003, pp. 348-353. (Year: 2003).*

Kraev et al, Authentication via RDP Using Electronic Identifiers, IEEE, Jan. 29, 2021, pp. 2361-2365. (Year: 2021).*

International application No. PCT/CA2022/050381 International Search Report dated Jun. 15, 2022.

International application No. PCT/CA2022/050381 Written Opinion of the International Searching Authority dated Jun. 15, 2022.

\* cited by examiner

METHOD AND SYSTEM FOR GRANTING REMOTE ACCESS TO AN ELECTRONIC DEVICE

CROSS-REFERENCE TO RELATED APPLICATIONS

This application claims priority under 35 U.S.C. 119(e) of U.S. Provisional patent application bearing Ser. No. 63/166,628, filed on Mar. 26, 2021, the contents of which are hereby incorporated by reference.

TECHNICAL FIELD

The present disclosure relates generally to the field of electronic devices, and, more particularly, to methods and systems for granting remote access to an electronic device.

BACKGROUND

Electronic devices may require remote access to perform maintenance or debugging operations that may not be initially envisioned when designing these devices. The purchasers of these devices typically doesn't have access to perform these maintenance or debugging operations. Rather, these operations are usually performed by the manufacture or qualified support personnel.

Because these operations are typically not initially foreseen, these devices need to be configured to allow an administrative account to connect to the underlying operating system in a secure manner. The traditional solution for connecting to an electronic device for maintenance or debugging operations includes storing a known hashed password on the device; however, this isn't secure as the password could be leaked which exposes the device to security threats. Alternatively, digital certificates could be used, however, this approach is relatively complex and certificates are normally used to provide identity and not access permissions.

As such, there is room for improvement.

SUMMARY

The present disclosure is generally drawn to methods, systems, devices, and computer readable media for granting remote access to an electronic device.

The granting of the remote access to the electronic device may be, for example, for servicing of the electronic device by a support person that is granted administrative or servicing access to the electronic device by a user of the electronic device. The user may, via a device user computer, authenticate with the electronic device using a user account and request that the electronic device provide the device user computer with an encrypted password corresponding to a password that is periodically generated at the electronic device and can be used to gain administrative or servicing access to the electronic device. The encrypted password may be generated by encrypting the periodically generated password with a public encryption key. The user with the user account may not have administrative or servicing access to the electronic device and may not have access to the private encryption key corresponding to the public encryption key, and can thus not obtain the password and cannot gain administrative or servicing access to the electronic device. The user, via a device user computer, may transmit the encrypted password to a support computer of the support person. The support person may then decrypt the encrypted password with the private encryption key or may use a support server that has the private encryption key to have the encrypted password decrypted to obtain the password. The support person, via the support computer, may then connect to the electronic device with the password to gain administrative access and/or to service the electronic device.

In accordance with an aspect of the present disclosure: an electronic device receives an access initiation request from a device user computer; the electronic device obtains an encrypted password comprising a password encrypted with a public encryption key; the electronic device transmits the encrypted password to the device user computer for the device user computer to transmit the encrypted password to a support computer to have the encrypted password decrypted with a private encryption key corresponding to the public encryption key; the electronic device receiving an access request comprising the password from the support computer; and the electronic device grants the support computer access thereto when the password of the access request from the support computer corresponds to the password at the electronic device.

In accordance with an aspect of the present disclosure: a device user computer transmits an access initiation request to an electronic device; the device user computer obtains (e.g., receives) an encrypted password comprising a password encrypted with a public encryption key outputted by the electronic device (e.g., transmitted by the electronic device to the device user computer); and the device user computer transmits the encrypted password to a support computer for the support computer to have the encrypted password decrypted with a private encryption key corresponding to the public encryption key and for the support computer to request access to the electronic device by transmitting an access request to the electronic device with the password, whereby the electronic device grants the support computer access thereto when the password of the access request from the support computer corresponds to the password at the electronic device.

In accordance with an aspect of the present disclosure: a support computer receives an encrypted password from a device user computer, the device user computer having obtained (e.g., received) the encrypted password from an electronic device that outputted the encrypted password (e.g., transmitted the encrypted password to the device user computer), the encrypted password comprises a password encrypted with a public encryption key by the electronic device; the support computer obtains the password from the encrypted password; and the support computer requests access to the electronic device by transmitting an access request to the electronic device with the password, whereby the electronic device grants the support computer access thereto when the password of the access request from the support computer corresponds to the password at the electronic device. In some embodiments, the support computer decrypts the encrypted password with a private encryption key corresponding to the public encryption key to obtain the password. In some embodiments, the support computer transmits the encrypted password to a support server for the support server to decrypt the encrypted password with a private encryption key corresponding to the public encryption key to obtain the password and receives the password from the support server.

In accordance with an aspect of the present disclosure: a support server receives an encrypted password from a support computer, the encrypted password comprises a password encrypted with a public encryption key by an electronic device, the support computer having received the encrypted password from a device user computer that obtained the encrypted password from the electronic device; the support server decrypts the encrypted password with a private encryption key corresponding to the public encryption key to obtain the password; the support server transmits the password to the support computer for the support computer to request access to the electronic device by transmitting an access request to the electronic device with the password, whereby the electronic device grants the support computer access thereto when the password of the access request from the support computer corresponds to the password at the electronic device. In some embodiments, the support server receives a message comprising the encrypted password and device information of the electronic device. In some embodiments, the device information comprises an identifier indicative of the private encryption key corresponding to the public encryption key and the support server obtains the private encryption key using the identifier. In some embodiments, the support server receives a message comprising the encrypted password and an unencrypted key identifier indicative of the private encryption key corresponding to the public encryption key. In some embodiments, the support server obtains the private encryption key using the unencrypted key identifier. In some embodiments, the message further comprises encrypted device information. In some embodiments, the support server decrypts the encrypted device information with the private encryption key to obtain decrypted device information. In some embodiments, the support server records, in an auditable record, the decrypted device information. In some embodiments, the support server records, in the auditable record, one or more of the following: a timestamp; an identifier of the electronic device, an identifier of the support person associated with the support server, and an identifier of the user of the device user computer.

In accordance with an aspect of the present disclosure, there is provided a method for granting remote access to an electronic device. The method comprises: obtaining, at the electronic device, an encrypted password comprising a password encrypted with a public encryption key; outputting, by the electronic device, the encrypted password for a device user computer to transmit the encrypted password to a support computer to have the encrypted password decrypted with a private encryption key corresponding to the public encryption key; receiving, at the electronic device, an access request comprising the password from the support computer; and granting the support computer remote access to the electronic device when the password of the access request from the support computer corresponds to the password at the electronic device.

In some embodiments, the device user computer has a first level of access to the electronic device, the first level of access having at least one restriction to access of the electronic device. In some embodiments, the password is associated with a second level of access to the electronic device, the second level of access having access to the at least one restriction of the first level of access. In some embodiments, granting the support computer remote access to the electronic device comprises granting the support computer the second level of access to the electronic device. In some embodiments, the second level of access comprises access to perform servicing operations on the electronic device restricted by the first level of access. In some embodiments, the device user computer has non-administrative access to the electronic device. In some embodiments, granting the support computer remote access to the electronic device comprises granting the support computer administrative access to the electronic device. In some embodiments, the password is associated with an administrative account of the electronic device, and wherein the device user computer has been authenticated by the electronic device to a user account of the electronic device.

In some embodiments, the method further comprises receiving, at the electronic device, an access initiation request from the device user computer. In some embodiments, the access initiation request is a request for the encrypted password. In some embodiments, the access initiation request is a request for the electronic device to enable third-party remote access to the electronic device. In some embodiments, the method further comprises enabling the electronic device to allow third-party remote access to the electronic device. In some embodiments, the third-party remote access to the electronic device is administrative access to the electronic device. In some embodiments, the third-party remote access to the electronic device is the second level of access to the electronic device. In some embodiments, the method further comprises disabling the third-party remote access to the electronic device after a period of time has lapsed from a time that the remote access to the electronic device was enabled. In some embodiments, the method further comprising authenticating, at the electronic device, the device user computer prior to receiving the access initiation request.

In some embodiments, the method further comprises generating, by the electronic device, the password in response to the access initiation request. In some embodiments, the method further comprises generating, by the electronic device, the password during a boot sequence of the electronic device. In some embodiments, the method further comprises regenerating, by the electronic device, the password after a period of time has lapsed from a time that the password was previously generated. In some embodiments, the method further comprises storing the password in secure storage of the electronic device.

In some embodiments, obtaining the encrypted password comprises generating the encrypted password by encrypting the password with the public encryption key in response to the access initiation request. In some embodiments, obtaining the encrypted password comprises retrieving the encrypted password from computer readable memory of the electronic device.

In some embodiments, outputting, by the electronic device, the encrypted password comprises transmitting, by the electronic device, the encrypted password to the device user computer for the device user computer to transmit the encrypted password to the support computer to have the encrypted password decrypted with the private encryption key corresponding to the public encryption key.

In some embodiments, transmitting, by the electronic device, the encrypted password to the device user computer comprises transmitting, by the electronic device, a message comprising the encrypted password and device information to the device user computer.

In some embodiments, the device information comprises an identifier indicative of the private encryption key corresponding to the public encryption key, and wherein the support computer or a support server in communication with the support computer uses the identifier to obtain the private encryption key and decrypts the encrypted password with the private encryption key to obtain the password.

In some embodiments, obtaining the encrypted password comprises generating an encrypted message by encrypting a message comprising the password with the public encryption key, and wherein transmitting, by the electronic device, the encrypted password to the device user computer comprises transmitting, by the electronic device, the encrypted message to the device user computer. In some embodiments, the message further comprises device information.

In some embodiments, the support computer decrypts the encrypted password with the private encryption key corresponding to the public encryption key to obtain the password.

In some embodiments, the support computer transmits the encrypted password to a support server for the support server to decrypt the encrypted password with the private encryption key corresponding to the public encryption key and to receive the password from the support server. In some embodiments, the support server verifies an identity of a support person requesting that the support server decrypt the encrypted password and records, in an auditable record, the identity of the support person requesting that the support server decrypt the encrypted password prior to transmitting the password to the support computer.

In some embodiments, wherein receiving, at the electronic device, the access request comprising the password from the support computer comprises receiving, at the electronic device, the access request comprising the password from the support computer via the device user computer.

In accordance with an aspect of the present disclosure, there is provided an electronic device comprising: at least one processor; and at least one non-transitory computer-readable memory having stored thereon program instructions executable by the at least one processor for performing the method. For example, there is provided an electronic device comprising: at least one processor; and at least one non-transitory computer-readable memory having stored thereon program instructions executable by the at least one processor for: obtaining an encrypted password comprising a password encrypted with a public encryption key; outputting the encrypted password for a device user computer to transmit the encrypted password to a support computer to have the encrypted password decrypted with a private encryption key corresponding to the public encryption key; receiving an access request comprising the password from the support computer; and granting the support computer remote access to the electronic device when the password of the access request from the support computer corresponds to the password at the electronic device.

In accordance with an aspect of the present disclosure, there is provided a non-transitory computer-readable medium having stored thereon program instructions which, when executed by at least one processor, cause the at least one processor to perform operations for performing the method. For example, there is provided a non-transitory computer-readable medium having stored thereon program instructions which, when executed by at least one processor, cause the at least one processor to perform operations for: obtaining an encrypted password comprising a password encrypted with a public encryption key; outputting the encrypted password for a device user computer to transmit the encrypted password to a support computer to have the encrypted password decrypted with a private encryption key corresponding to the public encryption key; receiving an access request comprising the password from the support computer; and granting the support computer remote access to an electronic device when the password of the access request from the support computer corresponds to the password at the electronic device.

Any of the above features may be used together in any suitable combination.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
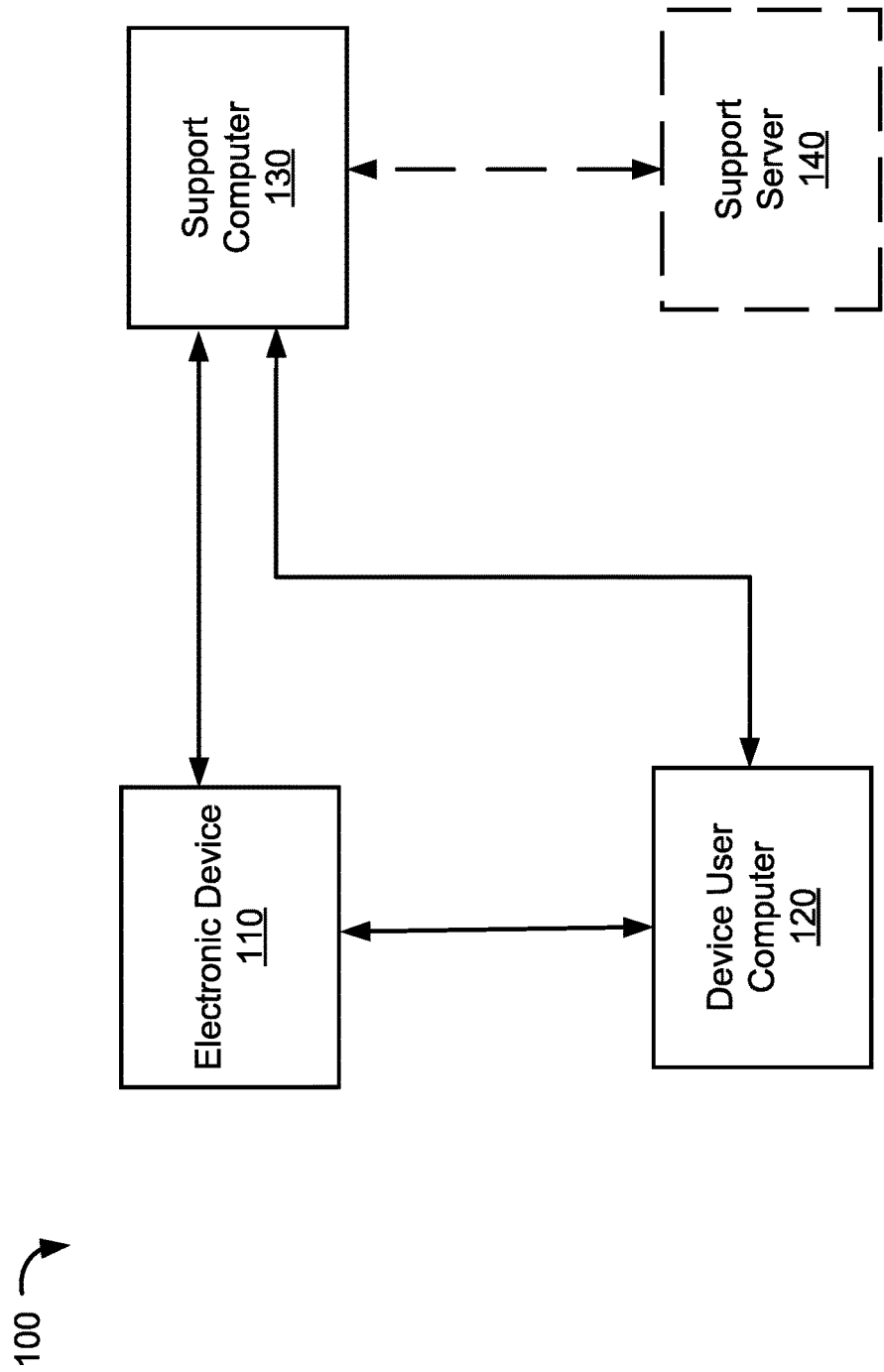
FIG. 1 is a schematic diagram of an example environment illustrating an electronic device for granting remote access thereto, in accordance with one or more embodiments.

With reference to FIG. 1, there is illustrated an example environment 100 comprising an electronic device 110 that remote access is granted to a support computer 130 by a device user computer 120.

Figure 5:
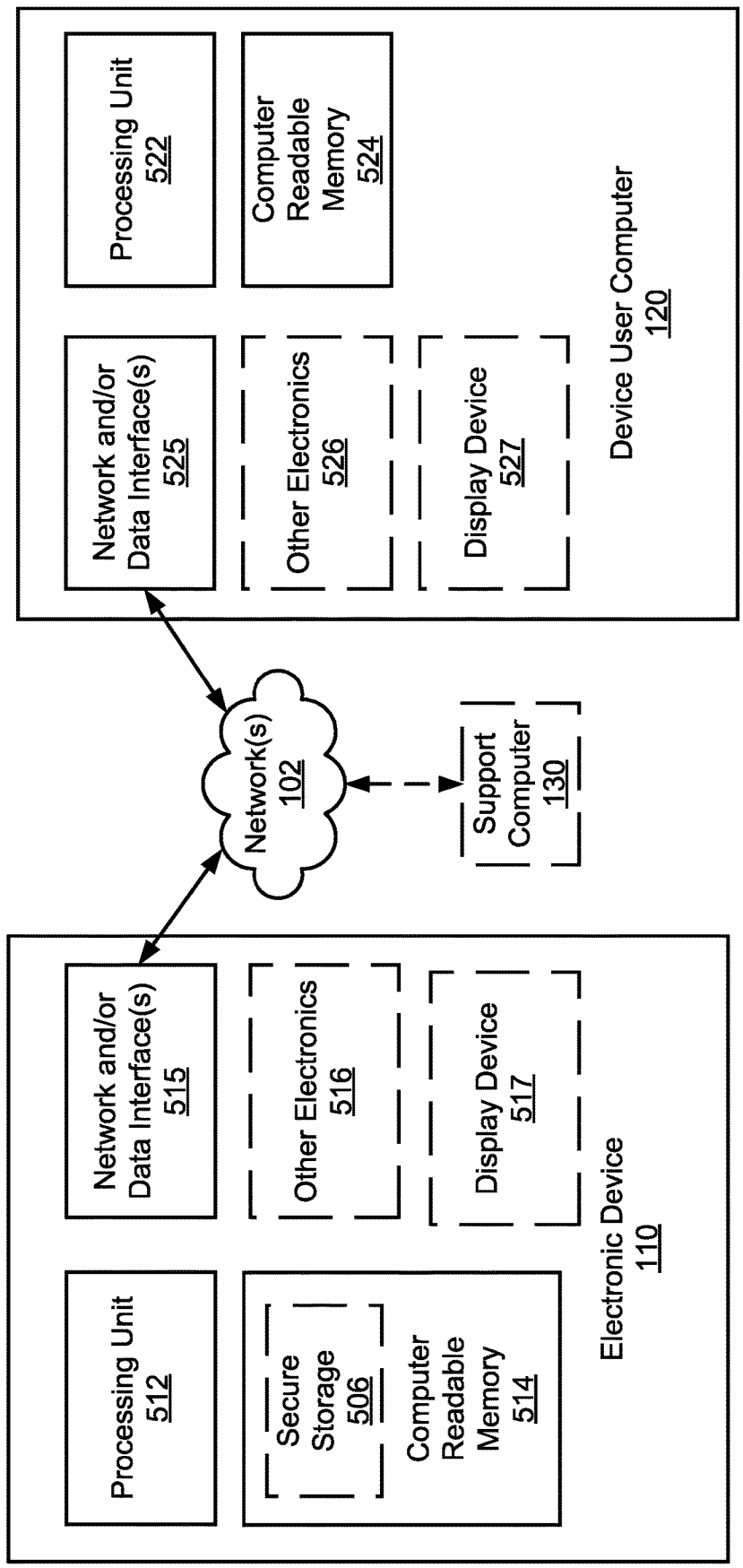
FIG. 5 is a schematic diagram of an example of the electronic device and the user device computer of FIG. 1, in accordance with one or more embodiments.

The electronic device 110 may be any suitable computing device. For example, the electronic device 110 may be an Internet of things (IoT) device. The electronic device 110 may be an embedded appliance. The electronic device 110 may be a video camera (e.g., an Internet protocol (IP) camera), an access control device (e.g., an IP access control device), or any other suitable electronic device. In accordance with an embodiment, the electronic device 110 is configured to allow a user of the device user computer 120 to enable the electronic device 110 for remote access by a third-party support person of the third-party support computer 130. The support computer 130 is "third-party" to the electronic device 110 and the device user computer 120, as the support computer 130 is a different computer/device from that of the electronic device 110 and the device user computer 120. With additional reference to FIG. 5, the electronic device 110 may have any suitable network and/or data interface(s) 515 for communicating with the device user computer 120 and/or the support computer 130. The electronic device 110 may comprise a secure storage 506. In accordance with an embodiment, the secure storage 506 is computer readable memory 514 of the electronic device 110. The secure storage 506 may be a reserved part of the computer readable memory 514 of the electronic device 110. The secure storage 506 may be a separate and/or dedicated computer readable memory from that of the computer readable memory 514. The secure storage 506 may be a trusted execution environment of a processing unit 512 of the electronic device 110 (not illustrated). The secure storage 506 corresponds to a space (e.g., computer readable memory, trusted execution environment, etc.) for storing data (e.g., a password, an encryption key, etc.) in a secure manner. The electronic device 110 may comprise any other electronics 516, which may depend on the type of the electronic device 110 (e.g., IoT device, IP camera, access control device, computer, etc.). The electronic device 110 may comprise or be connected to a display device 517 (e.g., via the data interface 515).

The device user computer 120 may be any suitable computing device. The device user computer 120 may be a workstation, a server, a mobile phone, a smart phone, a tablet, a laptop computer, or the like. The device user computer 120 may have any suitable network and/or data interface(s) 525 for communicating with the electronic device 110 and/or the support computer 130. The device user computer 120 may communicate with the electronic device 110 and/or support computer 130 by use of one or more wires, such as one or more network cables, by use of any suitable network equipment, and/or by wireless communication. The device user computer 120 may communicate with the electronic device 110 and/or support computer 130 over one or more networks 102. The network(s) 102 may comprise one or more public networks (e.g., the Internet) and/or one or more private networks. The network(s) 102 may comprise one or more of a PAN, MAN, LAN, WAN, mesh network, wireless network, Wi-Fi network, cellular network and/or any other suitable network(s). The network (s) 102 that the device user computer 120 communicates with the electronic device 110 may be at least in part the same or may be different from the network(s) that the device user computer 120 communicates with the support computer 130. The device user computer 120 comprises a processing unit 522 and computer readable memory 524. The device user computer 120 may comprise or be connected to a display device 527 (e.g., via the data interface 525). The device user computer 120 may comprise any other suitable computer components or other electronics 526.

Figure 6:
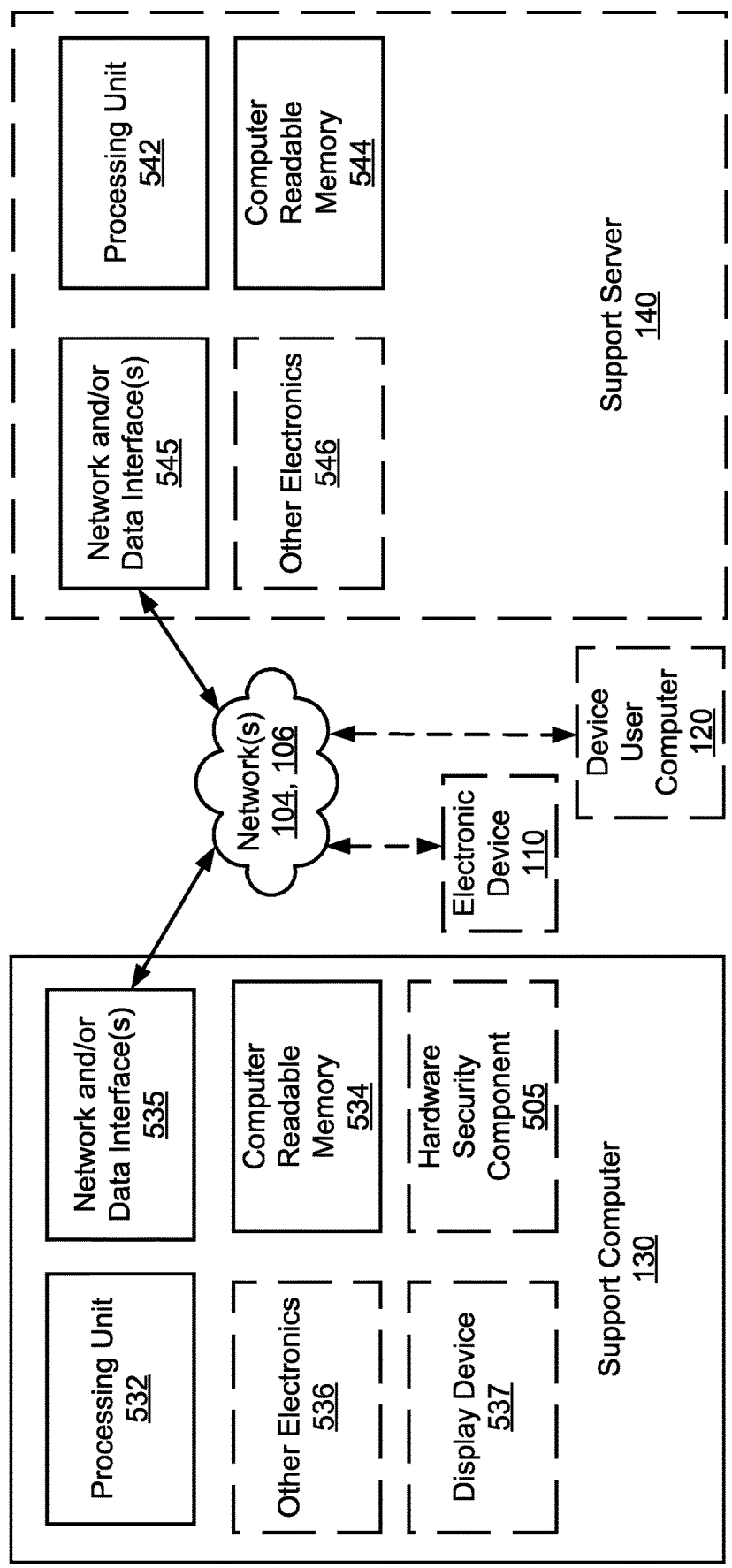
FIG. 6 is a schematic diagram of an example of the support computer and the support server of FIG. 1, in accordance with one or more embodiments.

Referring back to FIG. 1, and with additional reference to FIG. 6, the support computer 130 may be any suitable computing device. The support computer 130 may be a workstation, a server, a mobile phone, a smart phone, a tablet, a laptop computer, or the like. The support computer 130 may have any suitable network and/or data interface(s) 535 for communicating with the electronic device 110 and/or the device user computer 120. The support computer 130 may communicate with the electronic device 110 and/or device user computer 120 by use of one or more wires, such as one or more network cables, by use of any suitable network equipment, and/or by wireless communication. The support computer 130 may communicate with the electronic device 110 and/or device user computer 120 over one or more networks 104. The network(s) 104 may comprise one or more public networks (e.g., the Internet) and/or one or more private networks. The network(s) 104 may comprise one or more of a PAN, MAN, LAN, WAN, mesh network, wireless network, Wi-Fi network, cellular network and/or any other suitable network(s). The network(s) 104 that the support computer 130 communicates with the electronic device 110 may be at least in part the same or may be different from the network(s) 102 that the support computer 130 communicates with the device user computer 120. The support computer 130 may comprise or may connect to a hardware security component 505, for example, such as a hardware security module, a hardware authentication device (e.g., a YubiKey) or other portable or integrated hardware security device that is used to security maintain an encryption key (e.g. a private encryption key). The hardware security component 505 is any portable or integrated device or module that comprises computer readable memory used to security maintain an encryption key (e.g. a private encryption key). The support computer 130 comprises a processing unit 532 and computer readable memory 534. The support computer 130 may comprise or be connected to a display device 537 (e.g., via the data interface 535). The support computer 130 may comprise any other suitable computer components or other electronics 536.

In some embodiments, a support server 140 may be utilized. The support server 140 may be any suitable computing device(s), such as one or more computers, a server clusters, a mainframe, a computing cluster, a cloud computing system, a distributed computing system, a portable computing device, or the like. While reference is made herein to a/the "server" (or "support server") it should be understood that one or more servers may be used to implement the embodiments and/or examples described herein. The support computer 130 may communicate with the support server 140 by use of one or more wires, such as one or more network cables, by use of any suitable network equipment, and/or by wireless communication. The support server 140 may have any suitable network and/or data interface(s) 545 for communicating with the support computer 130. The support computer 130 may communicate with the support server 140 over one or more networks 106. The network(s) 106 may comprise one or more public networks (e.g., the Internet) and/or one or more private networks. The network(s) 106 may comprise one or more of a PAN, MAN, LAN, WAN, mesh network, wireless network, Wi-Fi network, cellular network and/or any other suitable network(s). The network(s) 106 that the support computer 130 communicates with the support server 140 may be at least in part the same or may be different from the network(s) 104 that the support computer 130 communicates with the device user computer 120 and/or the electronic device 110. The support server 140 comprises a processing unit 542 and computer readable memory 544. The support server 140 may comprise any other suitable computer components or other electronics 546.

Figure 7:
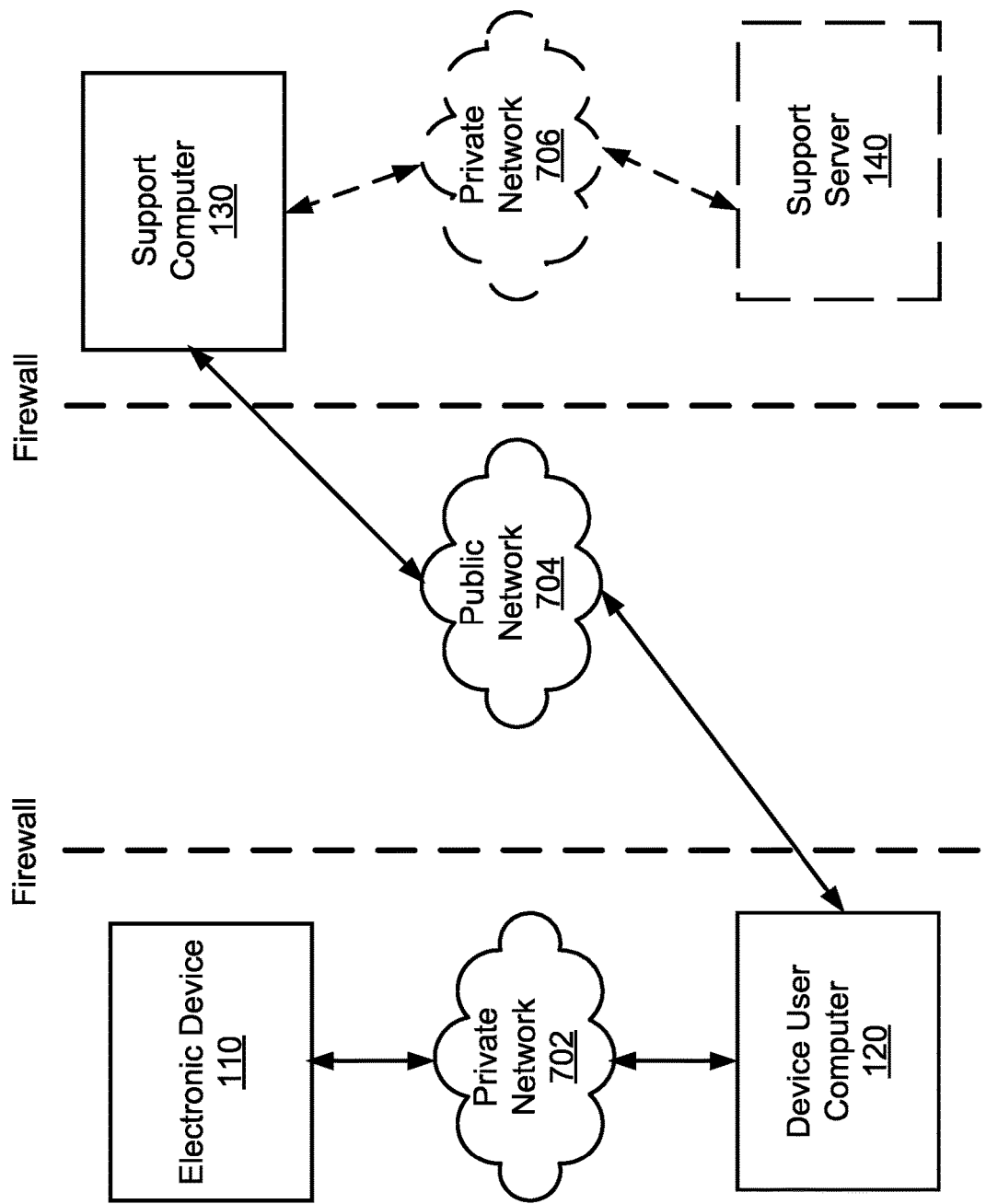
FIG. 7 is a schematic diagram of an example network configuration of the electronic device, the user device computer, the support computer and the support server, in accordance with one or more embodiments.

With reference to FIG. 7, a specific and non-limiting example of the communication networks of the environment 100 of FIG. 1 is shown. In this example, the electronic device 110 and the device user computer 120 are connected to a private network 702 and communicate with each other over the private network 702. The private network 702 may be a segregated or firewalled network, and some devices and/or computers within the private network 702 may not have access to any external networks (e.g., the public network 704). The device user computer 120 communicates with the support computer 130 over a public network 704 (e.g., the Internet). In this example, the electronic device 110 is not connected to the public network 704 (e.g., the Internet)—in other words, in this example, the electronic device 110 is without connection to the public network 704 (e.g., without connection to the Internet). The support computer 130 may connect to the device user computer 120 in order to gain access and connect to the electronic device 110. In this illustrated example, the support computer 130 may be connected to the support server 140 over another private network 706, for example, a segregated or firewalled network. The support server 140 may be configured to only be accessed by other computers (e.g., the support computer 130) within the private network 706. In alternative examples, the support computer 130 may be connected to the support server 140 over the public network 704 (not illustrated in FIG. 7). In another example, the electronic device 110 and the device user computer 120 may both be behind a firewall and communicate with each other over the private network 702, but are both separately able to communicate with the support server over the public network 704 (e.g., the Internet). By way of yet another specific and non-limiting example, the networks 102, 104, 106 shown in FIGS. 5 and 6 may be the same or may comprise the same network, which may be the Internet. Various other network configurations are possible, depending on practical implementations.

Figure 2:
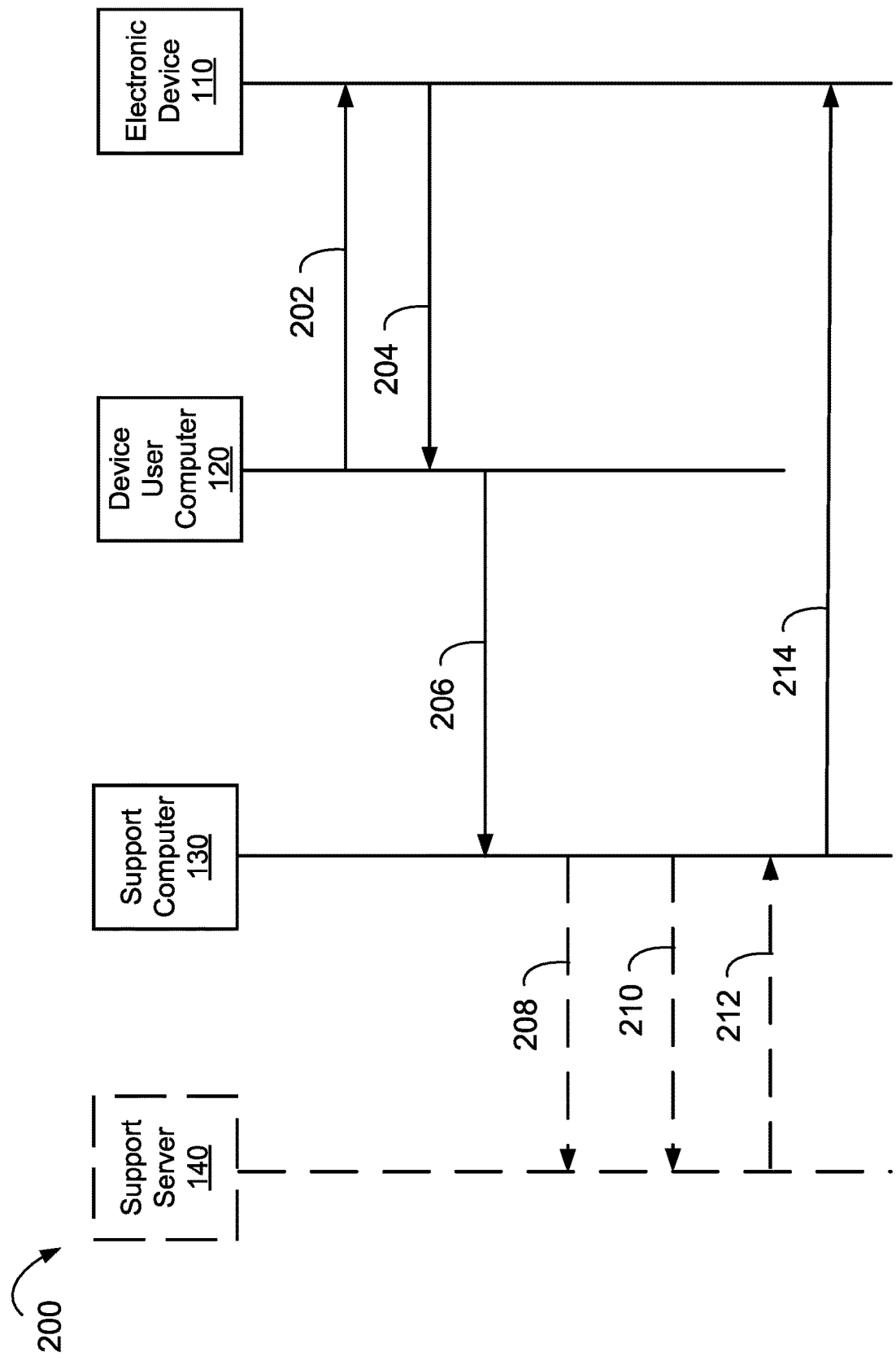
FIG. 2 is signal flow diagram illustrating an example method for granting remote access to an electronic deice, in accordance with one or more embodiments.
Figure 8:
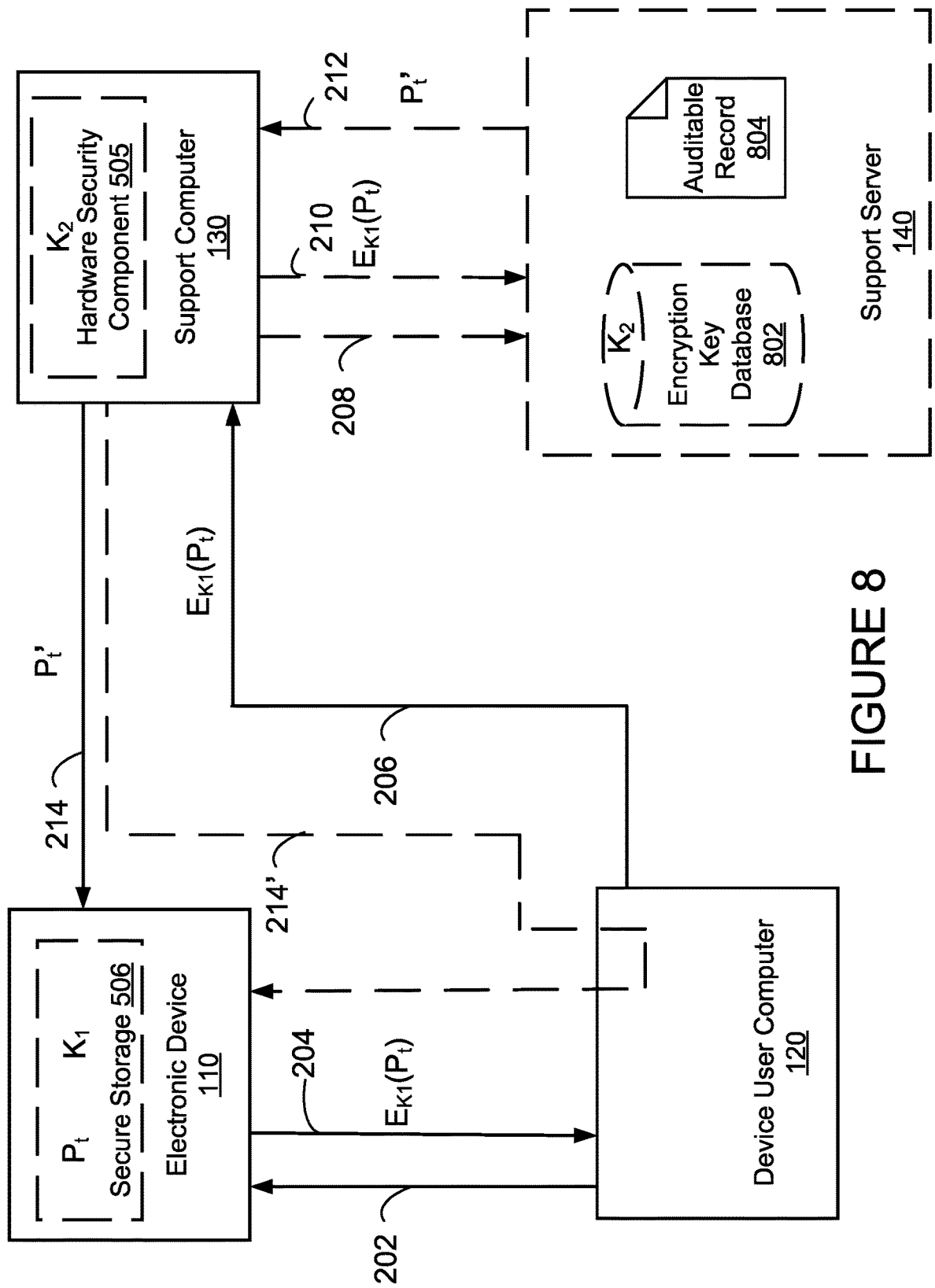
FIG. 8 is a schematic diagram of an example of the electronic device, the user device computer, the support computer and the support server illustrating the steps of FIG. 2, in accordance with one or more embodiments.

With reference to FIGS. 2 and 8, specific and non-limiting examples of granting access to the electronic device 110 are illustrated. At step 202, the device user computer 120 connects to the electronic device 110 to request that the electronic device 110 provide an encrypted password and/or enable remote access to the electronic device 110 to the support computer 130 (e.g., to initiate remote servicing of or administrative access to the electronic device 110). A user (e.g., owner, purchaser, manager, etc.) of the device user computer 120 may connect to the electronic device 110 via a portal of the electronic device 110 that requires that the user login to electronic device 110 to authenticate the user and form an authenticated communication channel between the device user computer 120 and the electronic device 110. The user may authenticate with the electronic device 110 using login credentials (e.g., a user password, a user identifier and a user password, etc.) of a user account, thereby causing the device user computer 120 to be authenticated to electronic device 110. Once the device user computer 120 is authenticated with the electronic device 110, the user via the device user computer 120 may then request that the electronic device 110 enable remote access to the electronic device 110 by the support computer 130. Alternatively, the authentication and the request that the electronic device 110 enable remote access to the support computer 130 may occur as part of the same request. The electronic device 110 may enable specific remote access capabilities of the electronic device 110 in response to this remote access activation request, which may otherwise not be enabled (e.g., administrative or servicing remote access capabilities that are otherwise disabled until requested and enabled by the user of the electronic device 110).

At step 204, the electronic device 110 transmits a message that corresponds to at least an encrypted password $E_{K1}(P_t)$ to the device user computer 120. The encrypted password $E_{K1}(P_t)$ may be generated using asymmetric encryption (e.g., RSA (Rivest-Shamir-Adleman), ElGamal or any other suitable encryption technique). The encrypted password $E_{K1}(P_t)$ may be generated by encrypting a password $P_t$ with a public encryption key $K_1$ of a public-private encryption key pair $(K_1, K_2)$. The password $P_t$ that is encrypted would be different from any user password that the user of the device user computer 120 may use to authenticate with the electronic device 110 at step 202. The public key $K_1$ may not be deliberately made publicly available; however, it would typically be assumed that the public key $K_1$ is known to an attacker. The public key $K_1$ may be stored in the secure storage 506, for example, during manufacturing, calibrating, or configurating of the electronic device 110. Accordingly, the electronic device 110 may be provided with the public key $K_1$ securely stored in the secure storage 506. The public key $K_1$ is preferably stored in the secure storage 506 that is tamper proof, so that an attacker cannot replace it with a public key for which the attacker possess the corresponding private key. In other words, the public key $K_1$ is protected in integrity, but not necessarily confidentiality. The public key $K_1$ may be assigned to the electronic device 110 by an organization (e.g., manufacture), which has the corresponding private encryption key $K_2$. In some embodiments, the public key $K_1$ assigned to the electronic device 110 is unique to that electronic device 110. In some embodiments, the public key $K_1$ of the electronic device 110 is common or shared between multiple electronic devices.

In accordance with an embodiment, the password $P_t$ is ephemeral, i.e., it can only be used for a short period of time to connect to the electronic device 110. The password $P_t$ may be regularly periodically generated randomly or pseudo randomly. A true random number generator may be used to generate the password $P_t$, so that the generated random number cannot be guessed. The password $P_t$ may be generated during a boot sequence of the electronic device 110. For example, the electronic device may boot from the secure storage 506, so that any attacker cannot modify the instruction code or data of this boot sequence. The password $P_t$ may be stored in the secure storage 506 of the electronic device 110.

The password $P_t$ may be set to an administrative account of the electronic device 110. For example, the password $P_t$ may correspond to an administrative password. The administrative account different from the user account of the electronic device 110, as the administrative account provides a level of access to the electronic device 110 different from a level of access of the user account. For example, the level of access of the user account may allow the user of the user device computer 120 to connect to the electronic device 110 to perform certain operations that exclude servicing operations (e.g., maintenance and/or debugging operations), and possibly other operations, while the level of access of the administrative account may allow the support person to gain access to the underlying operating system of the electronic device 110 and/or to perform servicing operations (e.g., maintenance or debugging operations), and possibly other operations. In other words, the level of access of the user account and/or the device user computer 120 may be a limited or restricted access to the electronic device 110 and the level of access of the administrative account and/or the support computer may be full or administrate access to the electronic device 110. In general, the user account of the user that enable remote access to the electronic device 110, at step 202, may have a first level of access to the electronic device 110. This first level of access may be superior to other levels or access of other users that may use the electronic device 110. The first level of access may allow the user to enable remote access to the electronic device 110, while other users of the electronic device 110 may not be able to enable remote access. The first level of access may have one or more restrictions to the access to the electronic device 120. The first level of access may restrict access to the underlying operating system of the electronic device 110. The first level of access may restrict access to perform servicing operations (e.g., maintenance or debugging operations). A second level of access may be associated with the password $P_t$. The second level of access has access to the one or more restrictions of the first level of access. The second level of access may have access to the underlying operating system of the electronic device 110. The second level of access may have access to perform servicing operations (e.g., maintenance or debugging operations). It is noted that the terms "first" and "second" in regard to the level of access are used a labels to distinguish between the different levels of access. The first level of access may be non-administrative access. The second level of access may be administrative access.

In some embodiments, the password $P_t$ is generated when the remote access capabilities of the electronic device 110 is enabled. The password $P_t$ may be generated when the remote access capabilities of the electronic device 110 is enabled, for example, as an alternative to generating the password $P_t$ during the boot sequence.

The password $P_t$ may be regenerated after a single servicing connection is established with the password $P_t$ (e.g., after each administrative account access with the password). For example, once a connection is made with the password $P_t$, the password is regenerated. By way of another example, once a connection is made with the password $P_t$ and after this connection is ended, the password may be regenerated.

The password $P_t$ may be regularly regenerated after a time period has expired from the last time the password $P_t$ was generated. For example, the password $P_t$ may be regenerated, every certain number of minutes, every certain number of hours, every certain number of days, etc. The password $P_t$ may be regenerated after a time period has expired from the time that the encrypted password $E_{K1}(P_t)$ is provided to the device user computer (e.g., if the servicing request isn't made within a certain number of minutes, certain number of hours, etc.).

The message provided at step 204 may also comprise additional information, herein after referred to as "device information". The device information corresponds to information about the electronic device 110. The device information may comprise device specific information that is information that is unique to the electronic device 110. The device specific information may comprise one or more of: a device identifier of the electronic device 110, a serial number of the electronic device 110, an IP address of electronic device 110, a MAC address of the electronic device 110, or any other suitable identifier of the electronic device 110, etc. The device information may comprise device related information. The device related information may comprise one or more of: a geographical location of the electronic device 110 (e.g., a GPS position of the electronic device 110), an identifier of the user of the device user computer 120 activating the remote access feature of the electronic device 110, a timestamp of the time that the message was created, etc. In embodiments where the electronic device 100 is not equipped with a trusted certificate, a public key signature of the electronic device 110 as used by a remote access subsystem (e.g., a SSH public key) may be included in the message. The device information may also be encrypted with the public key $K_1$. The device information may be provided as meta-data to the message provided at step 204. The meta-data conveying the device information may or may not be encrypted with the public key $K_1$.

The message provided at step 204 may be an encrypted message that comprises the password $P_t$ and the device information, which is encrypted with the public encryption key $K_1$. The message may be encrypted using RSA, ElGamal or any other suitable encryption technique. In embodiments where RSA is used, a secure padding scheme (e.g., OAEP) may also be used, so that the resulting scheme is semantically secured. The encoding format of the message may vary depending on practical implementations, and may be JSON, XML, YAML, CVS or any other suitable encoding format, which is used to identify the different parts of the message (e.g., the password $P_t$ from various device information provided in the message).

At step 206, the device user computer 120 transmits the message corresponding to at least the encrypted password $E_{K1}(P_t)$ to the support computer 130. The message and/or the encrypted password $E_{K1}(P_t)$ may be displayed on the display device 527 associated with the device user computer 120. The display device 527 (or any of the other display devices 517 or 537) may be a cathode ray tube display device, a light emitting diode (LED) display device, a liquid crystal display (LCD) display device, a touch screen, or any other suitable display device. The display device 527 may be part of the user computer 120 or separate therefrom. The display device 527 may display the message and/or encrypted password $E_{K1}(P_t)$ via a serial console, a web page, or by using any other suitable technique. The user may transmit the displayed message and/or encrypted password $E_{K1}(P_t)$ (e.g., copying and pasting the displayed message and/or encrypted password to another message or communication that is transmitted to the support computer 130. The user may manually read any device information, for example, off of a label of the electronic device 110, and transmit this device information along with the encrypted password $E_{K1}(P_t)$ to the support computer 130. The device user, via the device user computer 120, is unable to decrypt the encrypted password $E_{K1}(P_t)$ to obtain the password, as the device user does not know of the private key $K_2$ and cannot access the support server 140 to have the encrypted password $E_{K1}(P_t)$ decrypted. The device user, via the device user computer 120, cannot connect to the administrative account of the electronic device 110 despite the electronic device 110 being enabled for remote access.

In some embodiments, the support computer 130 may have the private key $K_2$ corresponding to the public key $K_1$ of the public-private encryption key pair ($K_1$, $K_2$) used to encrypt the password $P_t$ and/or the message. The support person may use the support computer 130 to have the encrypted password $E_{K1}(P_t)$ and/or encrypted message, or parts of the message that are encrypted, decrypted with the private key $K_2$ to obtain the password $P_t$ and, optionally, any device information which was encrypted. The obtained password $P_t$ is shown as $P_t'$ in FIG. 8 (i.e., with the addition of the prime symbol) to indicate that the password $P_t'$ was obtained from the encrypted password $E_{K1}(P_t)$ after being decrypted with the private key $K_2$. Reference herein to the password $P_t'$ refers to it being obtained from the encrypted password $E_{K1}(P_t)$. The hardware security component 505 (e.g., the hardware security module or the hardware authentication device) of the support computer 130 may be used to decrypt the encrypted password $E_{K1}(P_t)$ and/or encrypted message or parts of the message that are encrypted. The hardware security module of the support computer 130 may store the private key $K_2$ corresponding to the public key $K_1$ and may decrypt the encrypted password $E_{K1}(P_t)$ and/or message or parts of the message that are encrypted. By way other example, the support person may connect the hardware authentication device to the support computer 130 that contains the private key $K_2$ and use the hardware authentication device in decrypting the encrypted password $E_{K1}(P_t)$ and/or encrypted message or parts of the message that are encrypted. The support computer 130 may obtain the private key $K_2$ corresponding to the public key $K_1$ in any other suitable manner.

In some embodiments, the support person does not have direct access to the private key $K_2$ and may use the support server 140 to have the encrypted password $E_{K1}(P_t)$ and/or encrypted message, or parts of the message that are encrypted, decrypted with the private key $K_2$. At step 208, in some embodiments, the support person connects to the support server 140. The support person of the support computer 130 may connect to the support server 140 via a portal of the support server 140 that requires that the support person to login to the support server 140 to authenticate the support person to form an authenticated communication channel between the support computer 130 and the support server 140. For example, the support person may authenticate with the support server 140 using login credentials (e.g., a support person password, a support person identifier and a support person password, etc.) of an account with the support server 140. Once the support computer 130 is authenticated with the support server 140, the support person via the support computer 130 may then request that the server decrypt the encrypted password $E_{K1}(P_t)$ and/or encrypted message. The authenticated communication channel may be a secure communication channel in order for the support server 140 to provide the unencrypted password $P_t'$ to the support computer 130 in a secure manner.

At step 210, in some embodiments, the message corresponding to at least the encrypted password $E_{K1}(P_t)$ is transmitted to the support server 140 from the support computer 130. In this example, as the support computer 130 is authenticated with the support server 140, the message corresponding to at least the encrypted password $E_{K1}(P_t)$ may be provided to the support server 140 from the support computer 130 over an authenticated and secure communication channel, for instance, so that the message is not replaced by an attacker. The requested access to the electronic device 110 may be verified at the support server 140 to confirm that the support person making the request is authorized to have access (e.g., administrative or servicing access) to the electronic device 110. The grant and/or denial of the request for access may be recorded at the support server 140, for example, in a database. The support server 140 decrypts the encrypted password $E_{K1}(P_t)$ and/or the encrypted message to obtain the password $P_t'$, and optionally, any device information in the encrypted message or parts of the message that are encrypted. The device information may be encrypted in the encrypted message to allow the support server 140 to audit who retrieves a password and for which electronic device. The support server 140 may store in a record 804 the identification information of the support person (e.g. the name of the support person, and/or an account identifier of the support person, etc.) making the request, the device information (e.g. one or more of: a device identifier, a serial number, a MAC address, IP address, etc.) decrypted from the encrypted message, or encrypted parts of the message, an identifier of the user that granted the support person access to electronic device 110 and/or a timestamp of the request. This record 804 may be auditable to confirm which support person accessed which electronic device and when and/or to identify which user granted the support person access. In some embodiments, at step 204, as least some meta-data (e.g., the device information or selective parts of the device information) and the password $P_t$ are both encrypted into a single message so that it is not possible to separate the meta-data from the password $P_t$ before decryption. This allows the support server 140 to retrieve and use the meta-data before returning the decrypted password $P_t'$, for example to create an auditable record of which device was accessed or to verify that the support person is authorized to access the device. The meta-data that forms part of the message that is encrypted may be referred to encrypted meta-data, as there may be additional unencrypted meta-data that forms part of the message that comprises the encrypted password $E_{K1}(P_t)$ and encrypted meta-data.

The device information and/or meta-data in the message may be used by the support sever 140 to identify the private key $K_2$ corresponding to the public key $K_1$. For example, the message and/or the meta-data of the message may comprise a key identifier, for example, a device identifier (e.g. a serial number, a MAC address, IP address, etc.) and the support server 140 may use the key identifier (e.g., device identifier) to obtain the private key $K_2$ to decrypt the encrypted password $E_{K1}(P_t)$ or encrypted message therewith. For example, when an encrypted message has encrypted therein both the password $P_t$ and the device information, unencrypted meta-data of the message comprise the device identifier or an other suitable identifier (e.g., a key identifier) is used to identify which private key $K_2$ to use to decrypt the encrypted message. The support server 140 may comprise a database 802 of identifiers (e.g., device identifiers, key identifiers, etc.) corresponding to different electronic device, where each identifier (e.g., device identifier, key identifiers, etc.) is associated in the database 802 with a private key having a public key assigned to a given electronic device. The support server 140 may query the database 802 with the identifier (e.g., device identifier) obtained from the message or the meta-data to retrieve the private key $K_2$ to decrypt the encrypted password $E_{K1}(P_t)$ therewith.

Figure 9:
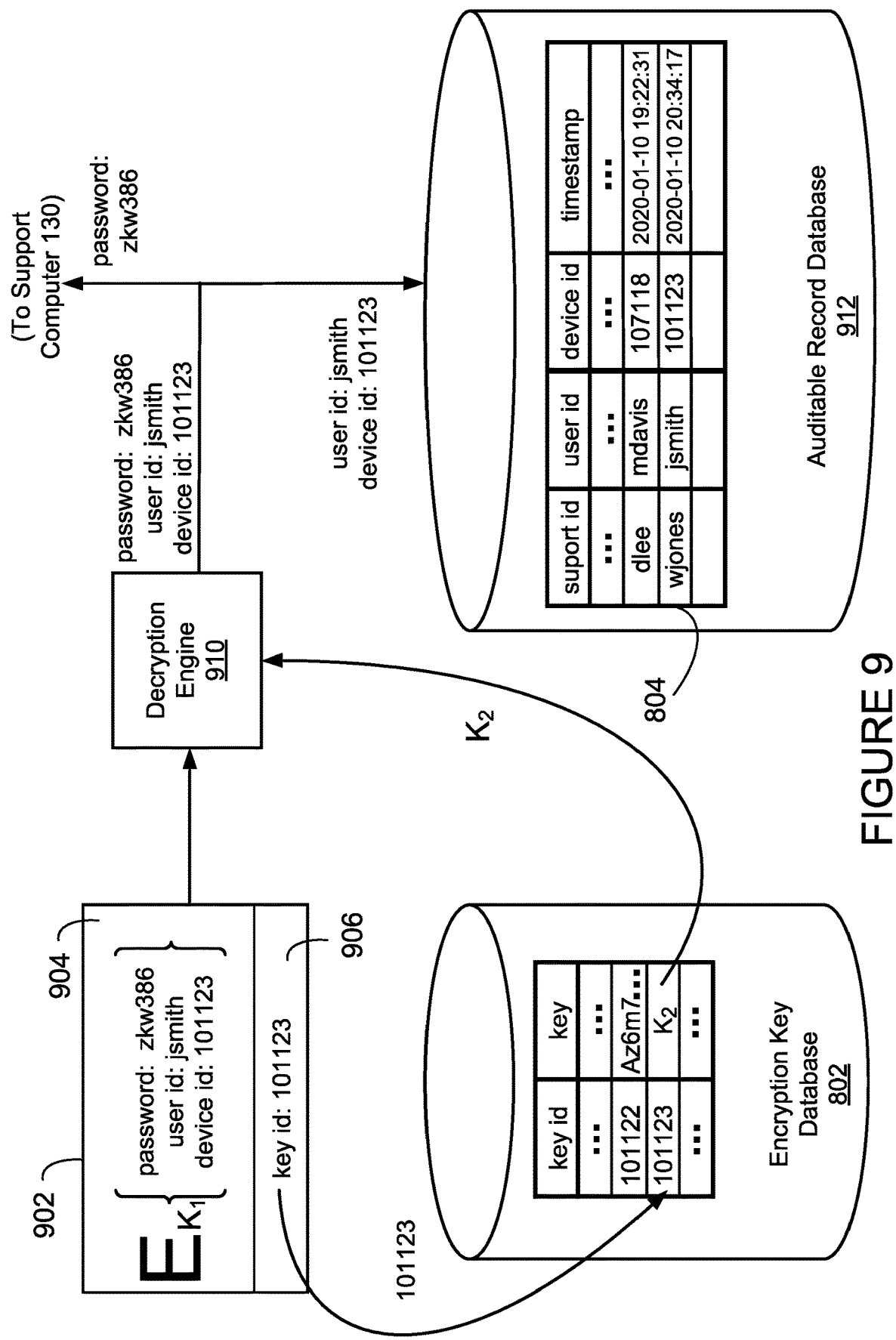
FIG. 9 is a schematic diagram of an example of the support server decrypting an encrypted password, in accordance with one or more embodiments.

With additional reference to FIG. 9, a specific and non-limiting example illustrates the above described process of obtaining the private key $K_2$ and storing the auditable record 804 at the support server 140. In this example, the message 902 generated by the electronic device 110 comprises an encrypted portion 904 that is encrypted with the public encryption key $K_1$ and a non-encrypted portion 906. For example, the encrypted portion 904 comprises the encrypted meta-data and the encrypted password $P_t$ and the non-encrypted portion 906 comprises the unencrypted meta-data. The non-encrypted portion 906 comprises the key identifier, which in this example, is a device identifier of the electronic device 110. The key identifier is used to identify and retrieve from the encryption key database 802 the private encryption key $K_2$ corresponding to the public encryption key $K_1$ used to encrypt the encrypted portion 904 of the message 902. In this example, the encrypted portion 904 comprises the password $P_t$, the user identifier of the user of the device user computer 120 that requested that the electronic device 110 be remotely accessed, and the device identifier of the electronic device 110. The encrypted portion 904 is then decrypted by a decryption engine 910 at the support server 140 using the private encryption key $K_2$ obtained from the database 802 to obtain the password $P_t'$, the user identifier, and the device identifier. In this example, the auditable record 804 is created in an auditable record database 912 to include the identifier of the support person making this request of the support server 140 in order to remotely access the electronic device 110, the user identifier of the user of the device user computer 120 that is authorizing access to the electronic device 110, the device identifier of the electronic device 110 being accessed, and the timestamp of the time of this request. The contents of the encrypted portion 904, the non-encrypted portion 906, and the auditable record 804 may vary from that shown in FIG. 9 depending on practical implementations. It should be appreciated that by creating the auditable record 804 that the support server 140 may be accessed to confirm which support person accessed which electronic device and when and/or to identify which user granted the support person access. For example, the auditable record database 912 of the support server 140 may be queried to generate a report of the remote accesses by a given user, a given support person, and/or a given electronic device. While the example of FIG. 9 is described as occurring at the support server 140, in alternative embodiments, this above described process(es) could be performed in a similar manner by the support computer 130. For example, the support computer 130 may comprise or connect to the encryption key database 802 (e.g., at the support sever 140) to obtain the private encryption key $K_2$. By way of another example, the support computer 130 may create the auditable record 804 in the auditable record database 912, which may be located at the support computer 130 or at the support server 140.

At step 212, in some embodiments, the support server 140 transmits the password $P_t'$ to the support computer 130. In this example, as the support computer 130 is authenticated with the support server 140, the password $P_t'$ may be provided to the support computer 130 from the support server 140 over the authenticated and secure communication channel. The support server 140 may transmit other information to the support computer 130. The support server 140 may transmit a network address (e.g., IP address, MAC address, etc.) and/or other information that may be obtained from the message (e.g., the device information, the encrypted meta-data, etc.) to the support computer 130 for the support computer 130 to use in requesting access to the electronic device 110.

At step 214, the support computer 130 connects to the electronic device 110 using the password $P_t'$. For example, a support person of the support computer 130 may connect to the electronic device 110 via a portal of the electronic device 110 that requires that the support person login to electronic device 110 with the password $P_t'$. The support computer 130 may known which electronic device to connect thereto based on information provided in the message (e.g., the device information) and/or based on information provided from the support server 140. The electronic device 110 receives an access request comprising the password $P_t'$ and the electronic device 110 compares the password $P_t'$ of the access request to the password $P_t$ stored in computer readable memory (e.g., the secure storage 506) of the electronic device 110 to determine if access should be granted or denied. The password $P_t'$ received as part of the access request may be a hash $h(P_t')$ of the password $P_t'$, and the electronic device 110 may compare the received hashed password $h(P_t')$ to a hash $h(P_t)$ of the password $P_t$ stored in computer readable memory 514 (e.g., the secure storage 506) of the electronic device 110. When the password $P_t'$ (or hash $h(P_t')$ thereof) received in access request corresponds to the password $P_t$ (or hash $h(P_t)$ thereof) stored at the electronic device 110, remote access is granted to the support computer 130. The support computer 130 once authenticated with the electronic device 110 may communication with the electronic device 100 over an authenticated communication channel. The support person via the support computer 130 may be granted administrative or servicing access to the electronic device 110. The support person via the support computer 130 may be granted administrative access to the operating system of the electronic device 110. The support person via the support computer 130 may then perform the servicing of the electronic device 110 (e.g., maintenance and/or debugging operations, and possibly other operations) or any other suitable operations. Once the support person is finished with the electronic device 110 and the connection with the support computer 130 is terminated, the electronic device 110 may then disable the third-party remote access (e.g., regenerate a new password).

It should be appreciated that by having a user with the device user computer 120 authenticate with the electronic device 110 and request that the electronic device 110 enable remote access, the electronic device 110 providing the encrypted password $E_{K1}(P_t)$ of a password $P_t$ that is periodically generated to the device user computer 120, and the user with the device user computer 120 providing the encrypted password to a support person with the support computer 130 which is able to have the encrypted password $E_{K1}(P_t)$ decrypted to obtain the password $P_t'$ for accessing the electronic device 110 therewith, that this may allow for the user to grant a support person access to the electronic device 110 without the user being able to gain the same level of access as the support person in a secure manner. It should further be appreciated that this approach may be useful to authenticate a support person to the electronic device 110 for the support person to perform unforeseen maintenance or servicing tasks on the electronic device 110.

In some embodiments, the support computer 130 is unable to connect directly to the electronic device 110 using the password $P_t'$ (e.g., as shown in FIG. 7) Rather, in some embodiments, as shown at step 214' in FIG. 8, the support computer 130 connects indirectly to the electronic device 110 via the device user computer 120. For example, the support person via the support computer 130 connects to the device user computer 120 using a remote access or support software (e.g., Bomgar). The device user may then be able to monitor what the support person is doing while accessing the electronic device 110. In this case, the device user doesn't have blind trust, as would be the case when the support person connects directly to the electronic device 110. In some embodiments, at step 202, the support computer 130 connects to the device user computer 120 in order to connect the device user computer 120 to the electronic device 110 to request that the electronic device 110 provide the encrypted password and/or enable remote access to the electronic device 110 to the support computer 130.

In some embodiments, the electronic device 110 is a computing device, such as one or more computers, a server clusters, a mainframe, a computing cluster, a cloud computing system, a distributed computing system, a portable computing device, or the like, which is running software multitenancy, which is a software architecture which runs on the electronic device 110 and servers multiple tenants. For example, the electronic device 110 may be a cloud based system (e.g., Amazon AWS, Microsoft Azure, etc.) running software provided or supported by an organization providing the support person, the support computer and/or the support server, which servers multiple tenants (e.g., multiple organizations, multiple users, etc.). A given tenant (e.g., the user described elsewhere in this document) of the electronic device 110 may authorize the support person access, in the manner described herein, to allow the support person to provide support and/or maintenance to the software running on the cloud-based system.

Figure 3:
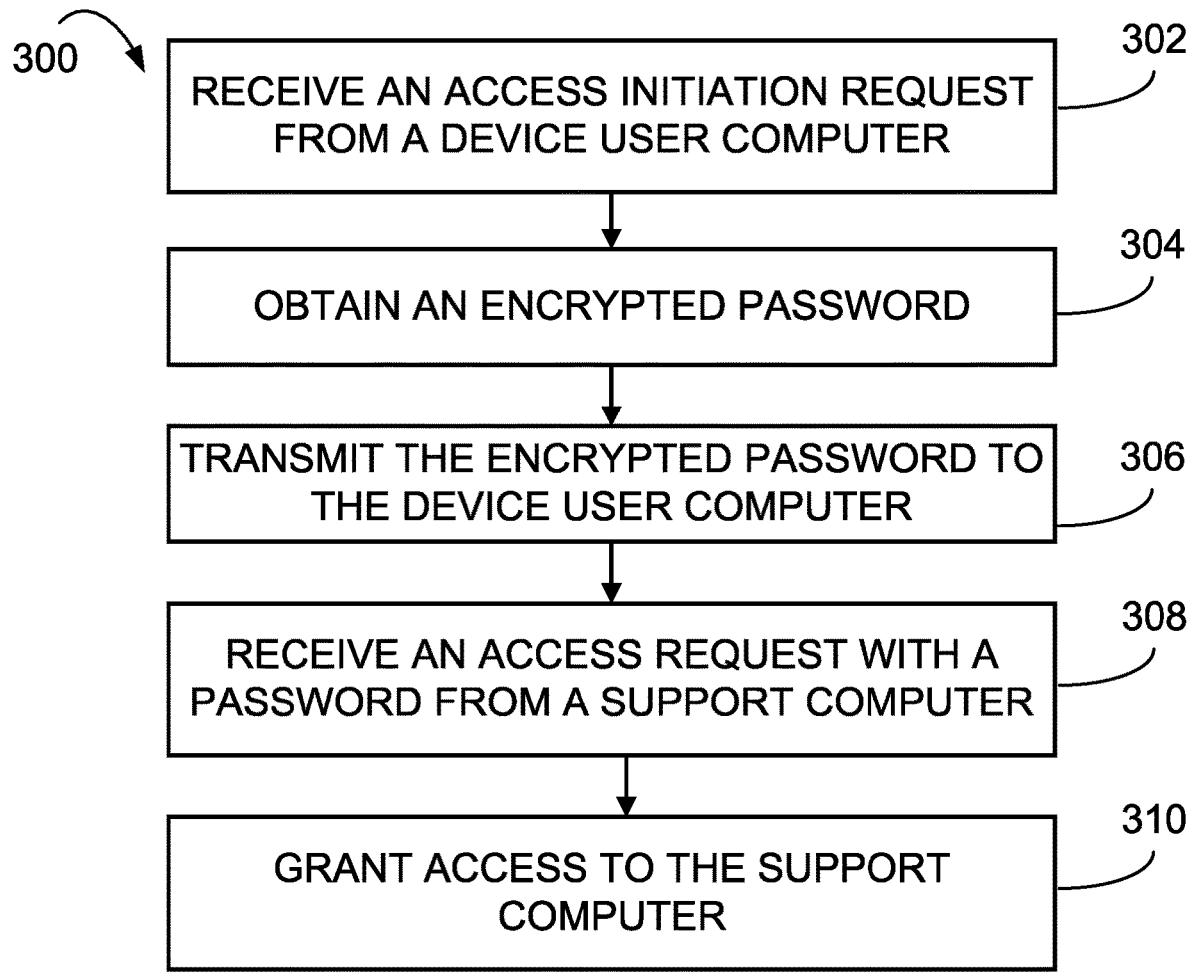
FIG. 3 is a flowchart illustrating an example method performed by an electronic device for granting remote access to the electronic device, in accordance with one or more embodiments.

With reference to FIG. 3, there is shown a flowchart illustrating an example method 300 for granting remote access to an electronic device, such as the electronic device 110. The method 300 is performed by an electronic device, such as electronic device 110, or by any other suitable electronic device(s). In explanation of the method 300, reference to the electronic device 100, the device user computer 120, the support computer 130 and/or support server 140 of FIGS. 1, 2 and 5 to 9 is made for example purposes, and the electronic device 110, the device user computer 120, the support computer 130 and/or support server 140 in the method 300 may vary depending on practical implementations.

At step 302 an access initiation request is received at the electronic device 110 from the device user computer 120. In some embodiments, the access initiation request is a request for an encrypted password. In some embodiments, the access initiation request is a request for the electronic device 110 to enable third-party remote access to the electronic device 110. In some embodiments, the method 300 further comprises enabling the electronic device to allow third-party remote access to the electronic device 110. The third-part remote access may otherwise be disabled until requested.

At step 304, an encrypted password $E_{K1}(P_t)$ comprising a password $P_t$ encrypted with a public encryption key $K_1$ is obtained at the electronic device 110. In some embodiments, step 304, comprises generating the password $P_t$. In some embodiments, step 304, comprises obtaining the password $P_t$ from computer readable memory 514 (e.g., the secure storage 506) of the electronic device 110, as the password $P_t$ in this case has already been generated. In some embodiments, obtaining the encrypted password $E_{K1}(P_t)$ at step 304 comprises generating the encrypted password $E_m(P_t)$ by encrypting the password $P_t$ with the public encryption key $K_1$ in response to the access initiation request. In some embodiments, obtaining the encrypted password $E_{K1}(P_t)$ at step 304 comprises retrieving the encrypted password $E_{K1}(P_t)$ from computer readable memory 514 of the electronic device 110.

At step 306, the encrypted password $E_{K1}(P_t)$ is transmitted by the electronic device 110 to the device user computer 120 for the device user computer 120 to transmit the encrypted password $E_{K1}(P_t)$ to the support computer 130 to have the encrypted password $E_{K1}(P_t)$ decrypted with a private key $K_2$ corresponding to the public key $K_1$. In some embodiments, the support computer 130 decrypts the encrypted password $E_{K1}(P_t)$ with the private key $K_2$ corresponding to the public key $K_1$ to obtain the password $P_t'$. In some embodiments, the support computer 130 decrypts the encrypted password $E_{K1}(P_t)$ with the private key $K_2$ using hardware security component 505 (e.g., the hardware security module or the hardware authentication device) that comprises the private key $K_2$. In some embodiments, the support computer 130 transmits the encrypted password $E_m(P_t)$ to the support server 140 for the support server 140 to decrypt the encrypted password $E_m(P_t)$ with the private key $K_2$ corresponding to the public key $K_1$ and to receive the password $P_t'$ from the support server 140. In some embodiments, the support server 140 verifies an identity of a support person requesting that the support server 140 decrypt the encrypted password $E_{K1}(P_t)$ and records, for example, in the record 804, the identity of the support person requesting that the support server 140 decrypt the encrypted password prior to transmitting the password $P_t'$ to the support computer 130.

At step 308, an access request is received at the electronic device 110 comprising the password $P_t'$ from the support computer 130. In some embodiments, the support computer 130 may connect directly with the electronic device 110. In some embodiments, the support computer 130 may correct to the device user computer 120 in order to connect to the electronic device 110 via the device user computer 120. Accordingly, step 308 may comprise receiving, at the electronic device 110, the access request comprising the password $P_t'$ from the support computer 130 via the device user computer 120.

At step 310, the support computer 130 is granted remote access to the electronic device 110. The support computer 130 is granted remote access to the electronic device 110 when the password $P_t'$ of the access request from the support computer 130 corresponds to the password $P_t$ at the electronic device 110 (e.g., as stored in the secure storage 506). The support computer 130 may be granted remote access to the electronic device 110 when the password $P_t'$ of the access request from the support computer 130 corresponds to the password $P_t$ of the encrypted password $E_m(P_t)$ transmitted to the device user computer 120, if the password $P_t$ has not yet been regenerated.

In some embodiments, the device user computer 120 has the first level of access to the electronic device 110. The first level of access has at least one restriction to access of the electronic device 110. The password $P_t$ may be associated with the second level of access to the electronic device 110. The second level of access has access to the at least one restriction of the first level of access. In some embodiments, granting the support computer remote access to the electronic device comprises granting the support computer the second level of access to the electronic device. The second level of access may comprise access to perform servicing operations on the electronic device restricted by the first level of access. The second level of access may comprise access to the underlying operating system of the electronic device restricted by the first level of access. The first level of access may allow the device user computer 120 to enable remote access to the electronic device 110. The first level of access may be non-administrative access. The second level of access may be administrative access. In some embodiments, the method 300 further comprises receiving, at the electronic device 110, one or more servicing operation requests (e.g., request for debugging, requests for maintenance, request for updating the operating system, request for updating software installed on the electronic device, etc.) from the support computer 130 and servicing the electronic device 110 according to the one or more servicing operation requests. In some embodiments, the method 300 further comprises disabling remote access capabilities to the electronic device 110 once the servicing operations on the electronic device 110 are completed. For example, the electronic device 110 may detect that the servicing connection has been disconnected and regenerate the password or disable use with the current password.

In some embodiments, the device user computer 120 has non-administrative access to the electronic device 110.

In some embodiments, granting the support computer 130 remote access to the electronic device 110 comprises granting the support computer 130 administrative access to the electronic device 110.

In some embodiments, the password $P_t$ is associated with an administrative account of the electronic device 110.

In some embodiments, the device user computer 120 has been authenticated by the electronic device 120 to a user account of the electronic device 110.

In some embodiments, the method 300 further comprises authenticating, at the electronic device 110, the device user computer 120 prior to receiving the access initiation request.

In some embodiments, third-party remote access to the electronic device is administrative access to the electronic device 110.

In some embodiments, the method 300 further comprises disabling third-party remote access to the electronic device 110 after a period of time has lapsed from a time that the remote access to the electronic device was enabled.

In some embodiments, the method 300 further comprises generating, by the electronic device 110, the password $P_t$ in response to the access initiation request.

In some embodiments, the method 300 further comprises generating, by the electronic device 110, the password $P_t$ during a boot sequence of the electronic device 110.

In some embodiments, the method 300 further comprises regenerating, by the electronic device 110, the password $P_t$ after a period of time has lapsed from a time that the password $P_t$ was previously generated.

In some embodiments, the method 300 comprises providing the electronic device 110 with the public key $K_1$ securely stored in the secure storage 506. The public key $K_1$ may be stored in the secure storage 506, for example, during manufacturing, calibrating, or configurating of the electronic device 110.

In some embodiments, the method 300 further comprises storing the password $P_t$ in secure storage 506 of the electronic device 110. The password $P_t$ may be stored in the secure storage 506 each time it is generated/regenerated.

In some embodiments, obtaining the encrypted password $E_{K1}(P_t)$ at step 304 comprises generating an encrypted message by encrypting a message comprising the password $P_t$ with the public key $K_1$. In some embodiments, transmitting, by the electronic device 110, the encrypted password $E_{K1}(P_t)$ to the device user computer 120 at step 306 comprises transmitting, by the electronic device 110, the encrypted message to the device user computer 120. In some embodiments, the message further comprises device information.

In some embodiments, transmitting, by the electronic device 110, the encrypted password $E_{K1}(P_t)$ to the device user computer 120 at step 306 comprises transmitting, by the electronic device 110, a message comprising the encrypted password $E_{K1}(P_t)$ and device information to the device user computer 120.

In some embodiments, the device information comprises an identifier indicative of the private encryption key $K_2$ corresponding to the public key $K_1$, the support computer 130 or the support server 140 in communication with the support computer 130 uses the identifier to obtain the private encryption key $K_2$ and decrypts the encrypted password $E_{K1}(P_t)$ with the private key $K_2$ to obtain the password $P_t'$.

In some embodiments, the support computer 130 decrypts the encrypted message with the private key $K_2$ corresponding to the public key $K_1$ to obtain the password $P_t'$, and optionally, the device information. In some embodiments, the support computer 130 transmits the encrypted message to the support server 140 for the support server 140 to decrypt the encrypted message with the private key $K_2$ corresponding to the public key $K_1$ and to receive the password $P_t'$, and optionally, the device information, from the support server 140. In some embodiments, the support server 140 verifies an identity of the support person requesting that the support server 140 decrypt the encrypted message and records the identity of the support person requesting that the support server 140 decrypt the encrypted message prior to transmitting the password $P_t'$ to the support computer 130. In some embodiments, the support server 140 stores the identity of the support person requesting that the support server 140 decrypt the encrypted message and/or encrypted password $E_{K1}(P_t)$ in an electronic record 804. In some embodiments, the support server 140 stores the identity of the support person requesting that the support server 140 decrypt the encrypted message and at least in part the decrypted contents of the encrypted message in the electronic record 804. For example, the support server 140 may store in the record 804 one or more of the following: one or more device identifiers of the electronic device 110 (e.g., one or more of: a serial number of the electronic device 110, an IP address of electronic device 110, a MAC address of the electronic device 110, etc.), one or more identifiers of the support person making the request for remote access to the electronic device 110 (e.g. the name of the support person, and/or an account identifier of the support person, etc.) one or more identifiers of the user of the user device computer 120 enabling the remote access of the electronic device 110 (e.g. the name of the user, and/or account identifier of the device user, for example, the user account at the electronic device 110, etc.) and one or more timestamps (e.g., one or more of: a timestamp of the time that the record was created at the support server 110, a timestamp of the time that the encrypted message was created by the electronic device, a timestamp of the time that the support person requested the support server 110 decrypt the encrypted message, etc.).

The order of the steps of the method(s) 200 and/or 300 may vary depending on practical implementations and when suitable to change the order. Similarly, when suitable, the various steps of the method(s) 200 and/or 300 described herein may be combined and/or omitted.

In some embodiments, at step 306, the encrypted password $E_{K1}(P_t)$ is outputted by the electronic device 110 for the device user computer 120 to transmit the encrypted password $E_m(P_t)$ to the support computer 130 to have the encrypted password $E_m(P_t)$ decrypted with a private key $K_2$ corresponding to the public key $K_1$. In some embodiments, step 202 and/or step 302 may be omitted. For example, the electronic device 110 may be configured to output the encrypted password $E_m(P_t)$ absent any access initiation request (i.e., without the device user's request). The electronic device may be configured to output the encrypted password $E_{K1}(P_t)$ automatically (e.g., during boot-up, or on a login screen, etc.) or when the electronic device is put into a specific mode of operation (e.g., a servicing mode). The electronic device 110 may output the encrypted password $E_{K1}(P_t)$ over a serial bus that the user device computer 120 may connect thereto. The electronic device may output the encrypted password $E_{K1}(P_t)$ over the data interface 515 (e.g., an HDMI output) to the display device 517 connected thereto and the user may copy the outputted encrypted password $E_{K1}(P_t)$ displayed on the display device 517 to the device user computer 120. The encrypted password $E_{K1}(P_t)$ may be outputted as a text string. The encrypted password $E_{K1}(P_t)$ may be outputted as a visual code that has encoded therein the encrypted password $E_{K1}(P_t)$, which the user may scan (e.g., with a camera of the device user computer 120) to obtain the encrypted password $E_{K1}(P_t)$. The visual code may be a two-dimensional matrix code, for example, such as provided by International Standard ISO/IEC 24778, 16022, or 18004. In some embodiments, the visual code used is a Quick Response (QR) code or a data matrix code. The visual code may be any other suitable visual code. Accordingly, at step 204 and/or step 306, the electronic device 110 may output a message that corresponds to at least an encrypted password $E_m(P_t)$ for the device user computer 120 to obtain directly or indirectly from the electronic device 110.

In alternative embodiments, symmetric encryption may be used where both the electronic device 110 and the support server 140 (or the support computer 130, or hardware security component 505, etc.) have the symmetric encryption key. For example, in this alterative embodiment: the electronic device 110 receives an access initiation request from the device user computer 120; the electronic device 110 obtains an encrypted password comprising a password encrypted with a symmetric encryption key; the electronic device 110 transmits the encrypted password to the device user computer 120 for the device user computer 120 to transmit the encrypted password to a support computer 130 to have the encrypted password decrypted with the symmetric key; the electronic device 110 receiving an access request comprising the password from the support computer 130; and the electronic device 110 grants the support computer 130 access thereto when the password of the access request from the support computer 130 corresponds to the password at the electronic device 110. In alternative embodiments, where symmetric encryption is used, it becomes fundamental that the key be protected in confidentiality at both the electronic device 110 and the support server 140 (or the support computer 130, or hardware security module, or hardware authentication device, etc.).

In some embodiments, the electronic device 110 receives an access initiation request from the device user computer 120; the electronic device 110 obtains an encrypted password comprising a password encrypted with an encryption key; the electronic device 110 transmits the encrypted password to the device user computer 120 for the device user computer 120 to transmit the encrypted password to a support computer 130 to have the encrypted password decrypted; the electronic device 110 receiving an access request comprising the password from the support computer 130; and the electronic device 110 grants the support computer 130 access thereto when the password of the access request from the support computer 130 corresponds to the password at the electronic device 110. In some embodiments, the encryption key that the password is encrypted therewith is a first asymmetric encryption key, and the support computer 130 is to have the encrypted password decrypted with a second asymmetric encryption key. The first asymmetric encryption key may be a public key and the second asymmetric encryption key may be a private key, or vice versa. In some embodiments, the encryption key that the password is encrypted therewith is a symmetric encryption key, and the support computer 130 is to have the encrypted password decrypted with the symmetric encryption key. The encrypted password may be provided by way of an encrypted message comprising the password and, optionally, device information, encrypted with the encryption key (e.g., the first asymmetric encryption key or the symmetric encryption key). The support computer 130 may decrypt the encrypted password and/or encrypted message or the support server 140 may decrypt the encrypted password and/or encrypted message (e.g., using the second asymmetric encryption key or the symmetric encryption key, depending on the implementation). Accordingly, in the embodiments and/or examples described herein, the term "public key" (or "public encryption key") may be replaced with the term "first asymmetric encryption key" and the term "private key" (or "private encryption key") may be replaced with the term "second asymmetric encryption key". Similarly, in the embodiments and/or examples described herein, the term "public key" (or "public encryption key") and the term "private key" (or "private encryption key") may be replaced with the term "symmetric encryption key", where appropriate to do so.

Figure 4:
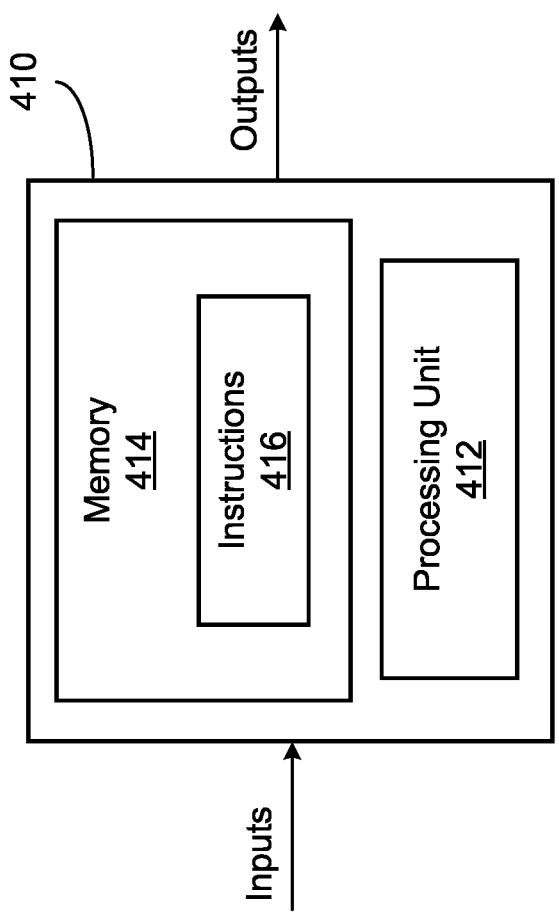
FIG. 4 is a schematic diagram of an example computing device, in accordance with one or more embodiments.

With reference to FIG. 4, the method(s) 200 and/or 300, may be implemented by one or more computing devices, such as a computing device 410 comprising a processing unit 412 and a memory 414 which has stored therein computer-executable instructions 416. Each of the electronic device 110, the device user computer 120, the support computer 130, and/or the support server 140 may each be implemented by and/or comprise at least one computing device, such as the computing device 410. The processing unit 512 and the memory 514 of the electronic device 110 may respectively correspond to the processing unit 412 and the memory 414 of the computing device 410 described herein. The processing unit 522 and the memory 524 of the device user computer 120 may respectively correspond to the processing unit 412 and the memory 414 of the computing device 410 described herein. The processing unit 532 and the memory 534 of the support computer 130 may respectively correspond to the processing unit 412 and the memory 414 of the computing device 410 described herein. The processing unit 542 and the memory 544 of the support server 140 may respectively correspond to the processing unit 412 and the memory 414 of the computing device 410 described herein.

The processing unit 412 may comprise any suitable devices configured to implement the method(s) 200 and/or 300 such that instructions 416, when executed by the computing device 410 or other programmable apparatus, may cause the functions/acts/steps performed as part of the method(s) 200 and/or 300 as described herein to be executed. The processing unit 412 may comprise, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof. The processing unit 412 may be referred to as a "processor".

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

The methods and systems described herein may be implemented in a high level procedural or object oriented programming or scripting language, or a combination thereof, to communicate with or assist in the operation of a computer system, for example the computing device 410. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 412 of the computing device 410, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for granting remote access to an electronic device, the method comprising:
obtaining, at the electronic device, an encrypted password comprising a password encrypted with a public encryption key;
outputting, by the electronic device, the encrypted password for a device user computer to transmit the encrypted password to a support computer for transmission to a support server to have the encrypted password decrypted by the support server with a private encryption key corresponding to the public encryption key, for verification by the support server of an identity of a support person requesting that the support server decrypt the encrypted password and for recordal, in an auditable record, of the identity of the support person that is requesting that the support server decrypt the encrypted password for transmission of the password to the support computer, and for reception of the password by the support computer following transmission of the password by the support server;
receiving, at the electronic device, an access request comprising the password from the support computer; and
granting the support computer remote access to the electronic device when the password of the access request from the support computer corresponds to the password at the electronic device.

2. The method of claim 1, wherein the device user computer has a first level of access to the electronic device, the first level of access having at least one restriction to access of the electronic device, and wherein the password is associated with a second level of access to the electronic device, the second level of access having access to the at least one restriction of the first level of access, and wherein granting the support computer remote access to the electronic device comprises granting the support computer the second level of access to the electronic device.

3. The method of claim 2, wherein the second level of access comprises access to perform servicing operations on the electronic device restricted by the first level of access.

4. The method of claim 1, wherein the device user computer has non-administrative access to the electronic device, and wherein granting the support computer remote access to the electronic device comprises granting the support computer administrative access to the electronic device.

5. The method of claim 1, wherein the password is associated with an administrative account of the electronic device, and wherein the device user computer has been authenticated by the electronic device to a user account of the electronic device.

6. The method of claim 1, further comprising receiving, at the electronic device, an access initiation request from the device user computer.

7. The method of claim 6, wherein the access initiation request is a request for the encrypted password.

8. The method of claim 6, wherein the access initiation request is a request for the electronic device to enable third-party remote access to the electronic device; and wherein the method further comprises enabling the electronic device to allow third-party remote access to the electronic device.

9. The method of claim 8, wherein the third-party remote access to the electronic device is administrative access to the electronic device.

10. The method of claim 8, further comprising disabling the third-party remote access to the electronic device after a period of time has lapsed from a time that the remote access to the electronic device was enabled.

11. The method of claim 6, further comprising generating, by the electronic device, the password in response to the access initiation request.

12. The method of claim 1, further comprising generating, by the electronic device, the password during a boot sequence of the electronic device.

13. The method of claim 1, further comprising regenerating, by the electronic device, the password after a period of time has lapsed from a time that the password was previously generated.

14. The method of claim 11, further comprising storing the password in secure storage of the electronic device.

15. The method of claim 6, wherein obtaining the encrypted password comprises generating the encrypted password by encrypting the password with the public encryption key in response to the access initiation request.

16. The method of claim 1, wherein outputting, by the electronic device, the encrypted password comprises transmitting, by the electronic device, the encrypted password to the device user computer for the device user computer to transmit the encrypted password to the support computer to have the encrypted password decrypted with the private encryption key corresponding to the public encryption key.

17. The method of claim 16, wherein transmitting, by the electronic device, the encrypted password to the device user computer comprises transmitting, by the electronic device, a message comprising the encrypted password and device information to the device user computer.

18. The method of claim 17, wherein the device information comprises an identifier indicative of the private encryption key corresponding to the public encryption key, and wherein the support computer or a support server in communication with the support computer uses the identifier to obtain the private encryption key and decrypts the encrypted password with the private encryption key to obtain the password.

19. The method of claim 1, wherein the support computer decrypts the encrypted password with the private encryption key corresponding to the public encryption key to obtain the password.

20. The method of claim 1, wherein receiving, at the electronic device, the access request comprising the password from the support computer comprises receiving, at the electronic device, the access request comprising the password from the support computer via the device user computer.

21. An electronic device configurable for granting remote access thereto, the electronic device comprising:
a processing unit; and
a non-transitory computer-readable medium storing thereon instructions executable by the processing unit for causing the electronic device to perform:
obtaining, at the electronic device, an encrypted password comprising a password encrypted with a public encryption key;
outputting, by the electronic device, the encrypted password for a device user computer to transmit the encrypted password to a support computer for transmission to a support server to have the encrypted password decrypted by the support server with a private encryption key corresponding to the public encryption key, for verification by the support server of an identity of a support person requesting that the support server decrypt the encrypted password and for recordal, in an auditable record, of the identity of the support person that is requesting that the support server decrypt the encrypted password for transmission of the password to the support computer, and for reception of the password by the support computer following transmission of the password by the support server;
receiving, at the electronic device, an access request comprising the password from the support computer; and
granting the support computer remote access to the electronic device when the password of the access request from the support computer corresponds to the password at the electronic device.

22. The system of claim 21, wherein the device user computer has a first level of access to the electronic device, the first level of access having at least one restriction to access of the electronic device, and wherein the password is associated with a second level of access to the electronic device, the second level of access having access to the at least one restriction of the first level of access, and wherein granting the support computer remote access to the electronic device comprises granting the support computer the second level of access to the electronic device.

23. The system of claim 21, wherein the instructions are executable by the processing unit for causing the electronic device to perform receiving, at the electronic device, an access initiation request from the device user computer.

24. The system of claim 23, wherein the access initiation request is a request for the electronic device to enable third-party remote access to the electronic device; and wherein the instructions are executable by the processing unit for causing the electronic device to perform enabling the electronic device to allow third-party remote access to the electronic device.

25. The system of claim 23, wherein the instructions are executable by the processing unit for causing the electronic device to perform generating, by the electronic device, the password in response to the access initiation request.

26. The system of claim 23, wherein obtaining the encrypted password comprises generating the encrypted password by encrypting the password with the public encryption key in response to the access initiation request.

27. The system of claim 21, wherein the instructions are executable by the processing unit for causing the electronic device to perform regenerating, by the electronic device, the password after a period of time has lapsed from a time that the password was previously generated.

28. The system of claim 21, wherein outputting, by the electronic device, the encrypted password comprises transmitting, by the electronic device, the encrypted password to the device user computer for the device user computer to transmit the encrypted password to the support computer to have the encrypted password decrypted with the private encryption key corresponding to the public encryption key.

29. The system of claim 28, wherein transmitting, by the electronic device, the encrypted password to the device user computer comprises transmitting, by the electronic device, a message comprising the encrypted password and device information to the device user computer.

30. The system of claim 29, wherein the device information comprises an identifier indicative of the private encryption key corresponding to the public encryption key, and wherein the support computer or a support server in communication with the support computer uses the identifier to obtain the private encryption key and decrypts the encrypted password with the private encryption key to obtain the password.

* * * * *